(12) United States Patent
Akagi

(10) Patent No.: US 6,436,190 B1
(45) Date of Patent: Aug. 20, 2002

(54) COATING APPARATUS AND METHOD OF COATING

(75) Inventor: Kiyoshi Akagi, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/527,644

(22) Filed: Mar. 17, 2000

(30) Foreign Application Priority Data

Mar. 23, 1999 (JP) .......................................... 11-077811

(51) Int. Cl.⁷ ................................................. B05C 3/12
(52) U.S. Cl. ......................... 118/419; 118/410; 118/50
(58) Field of Search .............................. 118/410, 419, 118/50; 427/402, 420

(56) References Cited

U.S. PATENT DOCUMENTS 2,681,294 A * 6/1954 Beguin 4,259,055 A * 3/1981 O'Brien

* cited by examiner

*Primary Examiner*—Brenda A. Lamb
(74) *Attorney, Agent, or Firm*—Bierman, Muserlian and Lucas

(57) ABSTRACT

A coating head discharges the coating solution in a discharging direction through a slit to a support and is designed such that a slit has a length M (mm) along the discharging direction and a gap G (mm), and a manifold has a coating width L (mm) orthogonal to the discharging direction, a cross sectional area S (mm$^2$) and a circumferential length R (mm) of a cross section, wherein the coating head and the supplying means are arranged such that the coating solution is supplied symmetrically in terms of the center of the coating width of the manifold through the feeding port into the manifold, and dimensions of the coating head are determined to satisfy formula (1):

$$10^{-4} < (L^2 R^2 G^3)/(24 M S^3) < 10^{-2} \qquad (1)$$

19 Claims, 6 Drawing Sheets

S : AREA OF HATCHED PORTION
R : CIRCUMFERENTIAL LENGTH OF HATCHED PORTION

ONE WITH A PORTION OF A STRAIGHT LINE

ONE WITH A RECTANGULAR SHAPE

ONE WITH A SOMEWHAT SPECIAL SHAPE

ONE WITH A SEMI-RECTANGULAR SHAPE

COATING APPARATUS AND METHOD OF COATING

BACKGROUND OF THE INVENTION

This invention relates to a coating apparatus and the method of coating for coating a long-sized supporting member which is reversed and transported by a backup roll with a coating solution, and in particular, to a coating apparatus and the method of coating wherein defects owing to coating streaks are reduced and the uniformity of thickness of the coated film is improved.

Apparatus for coating a supporting member with a coating solution can be classified into two main groups from their method of coating. One is a group of a type wherein coating solution of an amount just enough for forming the film is extruded and put on a supporting member, and this group is consisted of coating apparatus of a "pre-metering type" represented by extrusion coating, slide-bead coating, curtain coating, etc., and the other group is consisted of "post-metering type" apparatus of a type wherein a large amount of coating solution is put on a supporting member and excessive amount of liquid is scraped off by a blade, an air knife, a roll, a wire-bar, etc. The outline about the method of coating is described in detail in "Modern coating and drying technology: Edward D. Cohen and Edgar B. Gutoff (1992 VCH Publishers, Ins.)".

In the post-metering type coating, the precision in the thickness of the primary coated film which is extruded from the coating head in the coating width direction (the direction perpendicular to the progressing of coating) is not required because excessively put liquid is later scraped off for adjusting the thickness, but an apparatus for post-metering is additionally required and a high-quality coating can not so much be expected for the theoretical reason.

On the other hand, pre-metering type coating is advantageous for a high-quality coating; however, because the coating solution extruded from the coating head makes the coated film as it is extruded, a high precision in the uniformity of thickness of it in the coating width direction is required. It is mostly correct to regard the uniformity of the thickness of the coated film in the coating width direction as the uniformity of the distribution of the amount of the extruded coating solution in the coating width direction.

For a technology for improving the uniformity of the distribution of the amount of the extruded coating solution in the coating width direction, it has been proposed to make the slit gap of the coating head narrow. However, merely to make the slit gap narrow causes the slit portion to be subjected to an excessive pressure of the coating solution, which poses problems that it becomes difficult to feed out the coating solution, and that alien substances and dusts in the coating solution become easy to be caught there. Further, there has been also a problem that in proportion to the slit gap being made narrower, a higher precision in the slit gap is required, to cause the working of the coating head to be difficult. Besides, as a similar technology, it has been proposed a technology to make the slit length longer, but it has also problems that a high coating solution pressure is required in the same way, and that the working of the coating head is difficult.

In the publication of TOKKAIHEI 8-266979, it is disclosed a technology for achieving the uniformity of the thickness of the coated film by measuring and controlling the amount of pressure loss in the manifold of the coating head and the amount of pressure loss in the slit by using a pressure gauge, not by a technique only to make the slit gap narrow or only to make the slit length long. However, the definition of the pressure loss is not clear, and there is a problem that it is practically troublesome because it is necessary to carry out the adjustment of the amount of pressure loss during the coating by the use of a pressure gauge. Further, the coating method disclosed in the above publication is only for use in the case where the supporting member is thin, equal to or thinner than 10 μm and coating is carried out wit h the supporting member being in a free-span state (a state where the supporting member is not held and transported as floating), and nothing is referred to about how it is in the method of coating capable of coating also a thick supporting member, wherein a supporting member is coated in the process of being held and reversed by a backup roll.

SUMMARY OF THE INVENTION

It is an object of this invention to provide a high-precision coating apparatus and the method of coating for coating a transported supporting member in the process of being held and reversed by a backup roll with a coating solution extruded from a coating head, wherein the uniformity of thickness of the coated film is achieved and defects owing to coating streaks are reduced.

The object of this invention can be accomplished by the following structures:

(1) A coating apparatus comprising a backup roll for holding and reversing a long-sized supporting member which is being transported continuously, a coating head for carrying out coating in the above-described process of reversing by extruding a coating solution onto said supporting member, and coating solution supplying means for supplying said coating solution to said coating head, wherein said coating head has at least one coating solution supplying opening for receiving said coating solution from said coating solution supplying means, a manifold connected to said coating solution supplying opening for extending coating solution in the coating width direction, and a slit connected to said manifold for extruding said coating solution, and said coating solution supplying opening and said coating solution supplying means are provided in a manner such that the supply of said coating solution to said manifold is made symmetrical in terms of the left and right sides with respect to the center of the coating width, and the relationship expressed by the inequality (1) is effective:

$$10^{-4}<(L^2R^2G^3)/(24MS^3)<10^{-2} \quad (1),$$

where M, G, L, S, and R have following meanings respectively:

M: the slit length [mm],
G: the slit gap [mm],
L: the coating width [mm],
S: the cross-sectional area of the manifold [mm$^2$], and
R: the circumferential length of the cross-section of the manifold [mm].

(2) A coating apparatus set forth in the above-described paragraph (1), wherein, for the aforesaid at least one coating solution supplying opening, one is provided at the center of the coating width of the aforesaid manifold.

(3) A coating apparatus set forth in the above-described paragraph (1), wherein, for the aforesaid at least one coating solution supplying opening, one is provided at each of the both ends of the coating width of the aforesaid manifold, and one half of the total amount of flow of the coating solution is supplied to each of said coating solution supplying openings from the aforesaid coating solution supplying means.

(4) A coating apparatus comprising a backup roll for holding and reversing a long-sized supporting member which is being transported continuously, a coating head for carrying out coating in the above-described process of reversing by extruding coating solution onto said supporting member, and coating solution supplying means for supplying said coating solution to said coating head, wherein said coating head has at least one coating solution supplying opening for receiving said coating solution from said coating solution supplying means, a manifold connected to said coating solution supplying opening for extending said coating solution in the coating width direction, and a slit connected to said manifold for extruding said coating solution, and said coating solution supplying opening and said coating solution supplying means are provided in a manner such that the supply of said coating solution to said manifold is made asymmetrical in terms of the left and right sides with respect to the center of the coating width direction, and the relationship expressed by the inequality (2) is effective:

$$5\times10^{-4}<(L^2R^2G^3)/(6MS^3)<5\times10^{-2} \quad (2),$$

where M, G, L, S, and R have following meanings respectively:

M: the slit length [mm],

G: the slit gap [mm],

L: the coating width [mm],

S: the cross-sectional area of the manifold [mm$^2$], and

R: the circumferential length of the cross-section of the manifold [mm].

(5) A coating apparatus set forth in (4), wherein said coating solution supplying opening is provided by one piece at one end of the coating width direction of said manifold.

(6) A coating apparatus set forth in any one of the above-described paragraphs (1) to (5), wherein the aforesaid manifold has the cross-section having a shape of a circle or a semicircle.

(7) A coating apparatus set forth in any one of the above-described paragraphs (1) to (6), wherein the cross-sectional area of the aforesaid coating head is equal to or larger than ten times the cross-sectional area of the aforesaid manifold.

(8) A coating apparatus set forth in any one of the above-described paragraphs (1) to (7), wherein a reduced pressure chamber is provided at the upstream side of the aforesaid coating head with respect to the transporting of the aforesaid supporting member which is being transported continuously.

(9) A coating apparatus set forth in the above-described paragraph (8), wherein the relationship expressed by the inequality (3) is effective:

$$\Delta P<(6\mu MQ)/(5LG^3) \quad (3),$$

where M, G, L, Q, A, and ΔP have the following meanings respectively:

M: the slit length [mm],

G: the slit gap [mm],

L: the coating width [mm],

Q: the amount of supply of the coating solution [cc/min], $\mu$: the viscosity of the coating solution [Pa·sec], and ΔP: the extent of reduction of pressure [Pa].

(10) The method of coating for carrying out coating by using any one of the coating apparatus set forth in the above-described paragraphs (1) to (9).

DETAILED DESCRIPTION OF THE PREFERRED EMBODIMENT

In the following, the embodiments of this invention will be explained with reference to the drawings.

Figure 1:
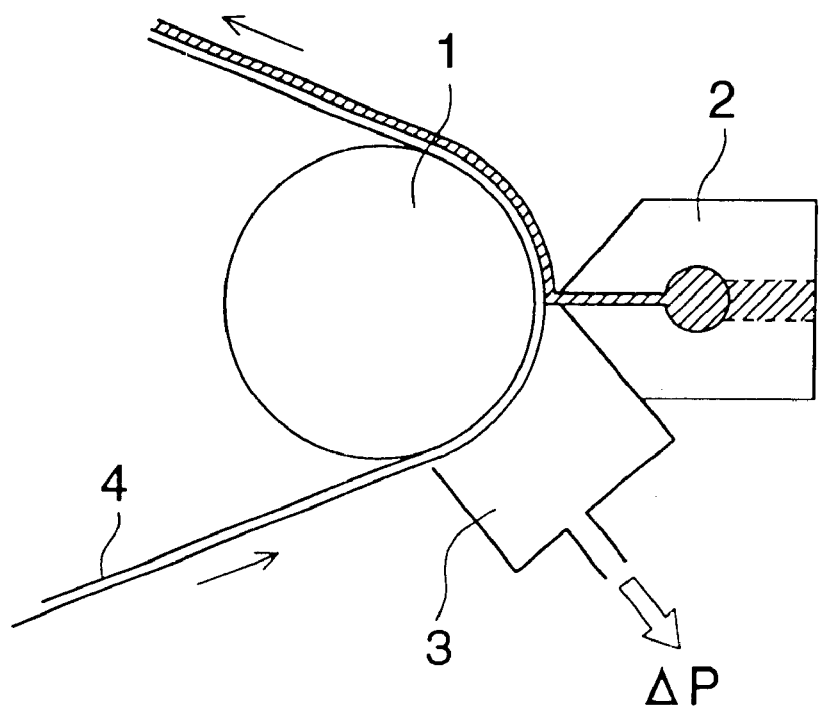
FIG. 1 is a schematic drawing showing a coating apparatus of this invention.

FIG. 1 is a schematic drawing showing a coating apparatus of this invention. In the drawing, 1 denotes the backup roll, 2 denotes the coating head of an extrusion type having dimensions satisfying the inequality (1) or (2), 3 denotes the reduced pressure chamber provided at the upstream side of the coating head 2, and 4 denotes a long-sized supporting member which is being transported in the direction of the arrow marks. In the process that the supporting member 4 is held and reversed by the backup roll 1, it is coated with the coating solution extruded from the coating head 2. Because the coating is carried out while the supporting member 4 is subjected to a tension applied to it by the backup roll 1, a stable coating can be carried out even on a thick supporting member (not thinner than 50 μm) for which a scar and creasing are likely to occur. The coating solution is supplied from a coating solution supplying means not shown in the drawing to the coating head 2. At the upstream side of the coating head 2 the reduced pressure chamber 3 is provided, and the pressure is reduced to the extent of the pressure reduction ΔP satisfying the inequality (3). The pressure in the neighborhood of the surface of the supporting member 4 before coating is reduced by the reduced pressure chamber 3, thus this apparatus has advantages that the frequency of the occurrence of the problem that defects of unevenness of coating are produced owing to the introduction of air between the supporting member and the coating solution called air-accompanying, and that the condition of coating is made broad, for example, coating can be done even with an arrangement in which the coating head is disposed away from the supporting member to some extent; hence, this is a desirable mode of this invention. Heretofore, the determination of the extent of the pressure reduction ΔP has been a time-taking operation in which an optimum extent of the reduction of pressure is determined after confirming the upper limit value and the lower limit value to make coating practicable through actual coating experiments; however, in this invention, the optimum value can be determined only by setting the pertinent quantities so as to satisfy the inequality (3) in connection with the coating head; hence, this is very efficient.

Besides, the reduction of pressure by the reduced pressure chamber 3 can be done by sucking the air in the reduced pressure chamber 3 by means of a pressure-reducing blower or the like. Further, the extent of the pressure reduction can be controlled by the extent of opening of a valve provided t the midway of the pressure-reducing blower. To state it concretely, it is appropriate that the extent of the pressure reduction is detected by means of a pressure sensor (or a manometer) provided at the midway of the pressure-reducing blower and the extent of opening of the valve is controlled on the basis of the detected extent of the pressure reduction.

Figure 2:
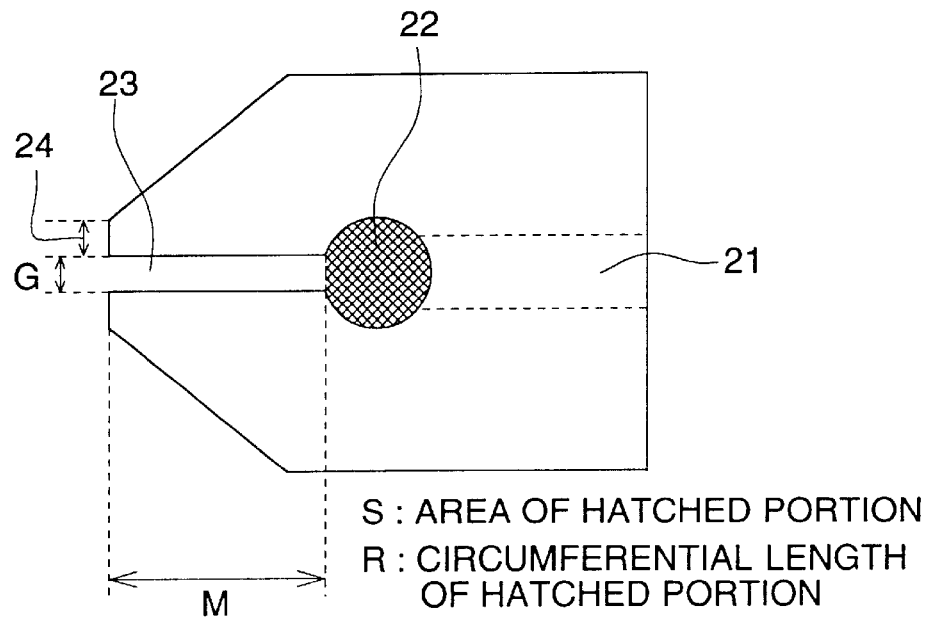
FIG. 2(a) and FIG. 2(b) are schematic drawings showing an example of the embodiment of the coating head in a coating apparatus of this invention.
Figure 2:
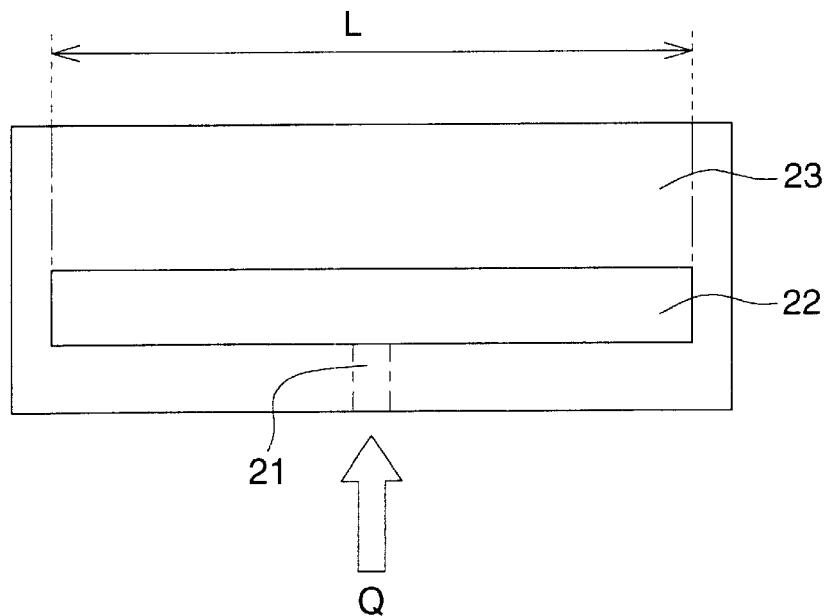

FIG. 2 is a schematic drawing showing an example of the embodiment of the coating head in a coating apparatus of this invention. FIG. 2(*a*) is the side view of the coating head, and FIG. 2(*b*) is the plan as seen from over the top of the same coating head. In the drawing, 21 denotes the coating solution supplying opening, 22 denotes the manifold, 23 denotes the slit, 24 denotes the length of the edge, M denotes the slit length, G denotes the slit gap, L denotes the coating width. S denotes the cross-sectional area of the manifold 22, and indicates the area of the hatched portion in the drawing R denotes the circumferential length of the cross-section of the manifold, and indicates the length of the circumference of the hatched portion in the drawing. Q denotes the amount (total amount) of supply of the coating solution to the manifold. In FIG. 2, the shape of the cross-section of the manifold 22 is circular, and it is desirable that the above-described dimensions satisfy the inequality (1), because the coating solution supplying opening 21 is provided at one position, namely, at the center of the coating width L and the supply of the coating solution is made symmetrically for the left and right sides with respect to the center of the coating width.

The coating solution is supplied from a coating solution supplying means not shown in the drawing to the coating solution supplying opening 21, is collected in the manifold 22, and is extruded through the slit 23.

The slit length M is the distance from the border with the manifold to the exit at the edge, and in the case where the lengths of the upper bar and the lower bar forming the slit are different from each other, the length of the shorter one is let to be the slit length M. Further, in this embodiment, the slit length M is constant with respect to the coating width direction of the coating head, and in the case where it is not constant owing to a problem in the accuracy of working etc., the shortest portion of it is let to be the slit length M.

The slit gap G is the distance between the upper bar and the lower bar forming the slit, and in this embodiment, it is constant along the lengthwise direction of the slit and the coating width direction, and in the case where it is not constant owing to a problem in the accuracy of working etc., the largest value of the distance is let to be the slit gap G.

The coating width L denotes the width of the slit capable of extruding the coating solution.

To satisfy the inequality (1), it is accomplished by varying suitably the above-described M, G, L, S, and/or R at the time of designing the coating head. By doing this, the uniformity of thickness of the coated film is achieved, and defects owing to coating streaks can be reduced. It can be completed at the designing stage of the coating head to control the above-described dimensions; hence, it is simpler and more advantageous than the conventional technology which requires controlling from the beginning to the last during the coating.

Further, in the case where a reduced pressure chamber is provided in a coating apparatus of this invention, by letting the amount of supply of the coating solution Q, the viscosity of the coating solution $\mu$, and the extent of the pressure reduction $\Delta P$ satisfy the inequality (3), the effect of this invention can be more remarkably obtained.

The amount of supply of the coating solution Q denotes the set value for the amount of supply of the coating solution by a pump or the like at the upstream side of the coating head. That is, it is a quantity defined by a pump and a flow meter etc.

The viscosity of the coating solution $\mu$ denotes the viscosity at the timing when the coating solution immediately before coating is extruded from the coating head. In the case where the coating solution is a non-Newtonian fluid, it is the viscosity in the expression of the shearing force acting to the flow in the slit.

The extent of the pressure reduction $\Delta P$ denotes the measured value of the extent of the pressure reduction in the reduced pressure chamber.

Figure 3:
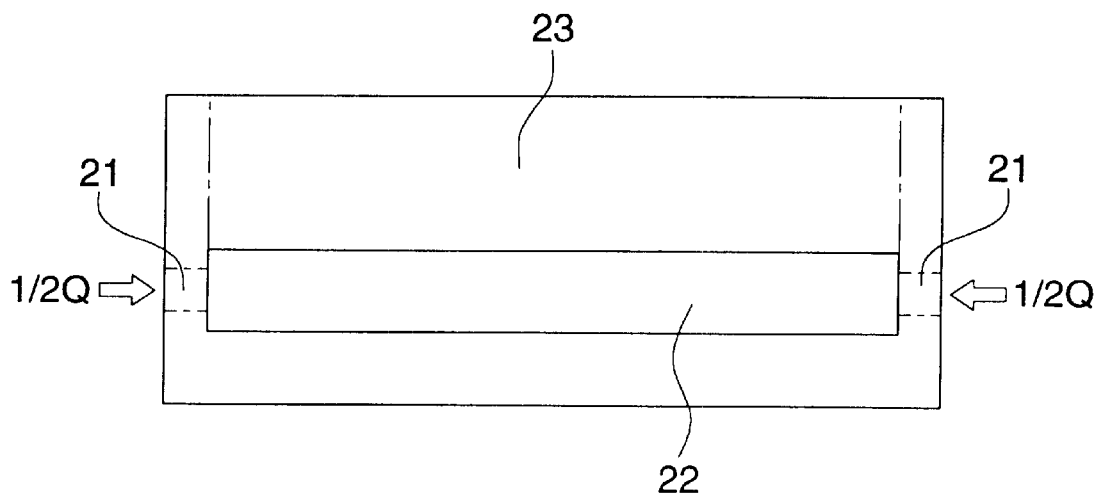
FIG. 3(a) and FIG. 3(b) are schematic drawings showing another two examples of the embodiment of the coating head in a coating apparatus of this invention.
Figure 3:
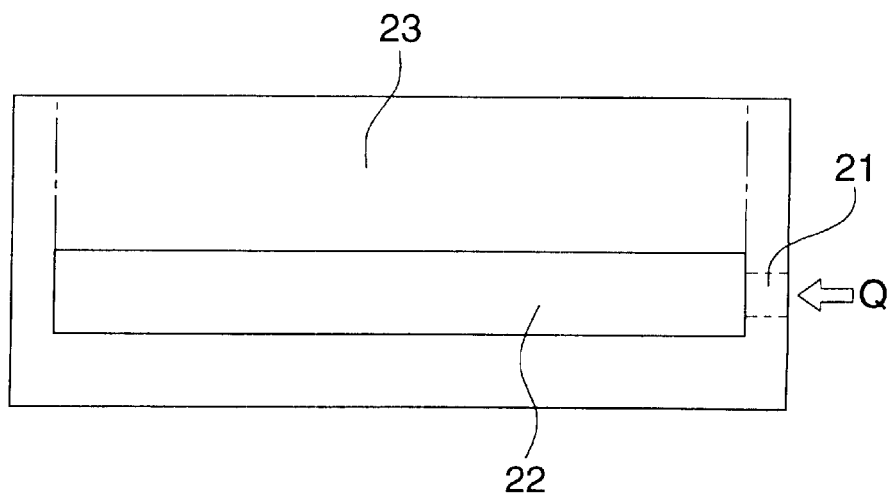

FIG. 3 are schematic drawings showing another two example of the embodiment of the coating head in a coating apparatus of this invention. In the drawing, 21, 22, and 23 are the same as the above-described ones.

The coating head shown in FIG. 3(*a*) has coating solution supplying openings 21 provided at each of the both ends of the manifold 22, one opening being provided for each end, and one half ((½)Q) of the total amount of supply of the coating solution is supplied from each opening. Because the supply of the coating solution is carried out in such a manner as to make it symmetrical in terms of left and right sides with respect to the center of the coating width of the manifold 22, the coating head shown in FIG. 3(*a*) is designed with the inequality (1) satisfied by the pertinent dimensions.

The coating head shown in FIG. 3(*b*) has a coating solution supplying opening 21 at one end of the manifold 22, and the total amount of supply of the coating solution Q is supplied from here. Because the supply of the coating solution is carried out in such a manner as to make it asymmetrical in terms of left and right sides with respect to the center of the coating width of the manifold 22, the coating head shown in FIG. 3(*b*) is designed with the inequality (2) satisfied by the pertinent dimensions.

Figure 4:
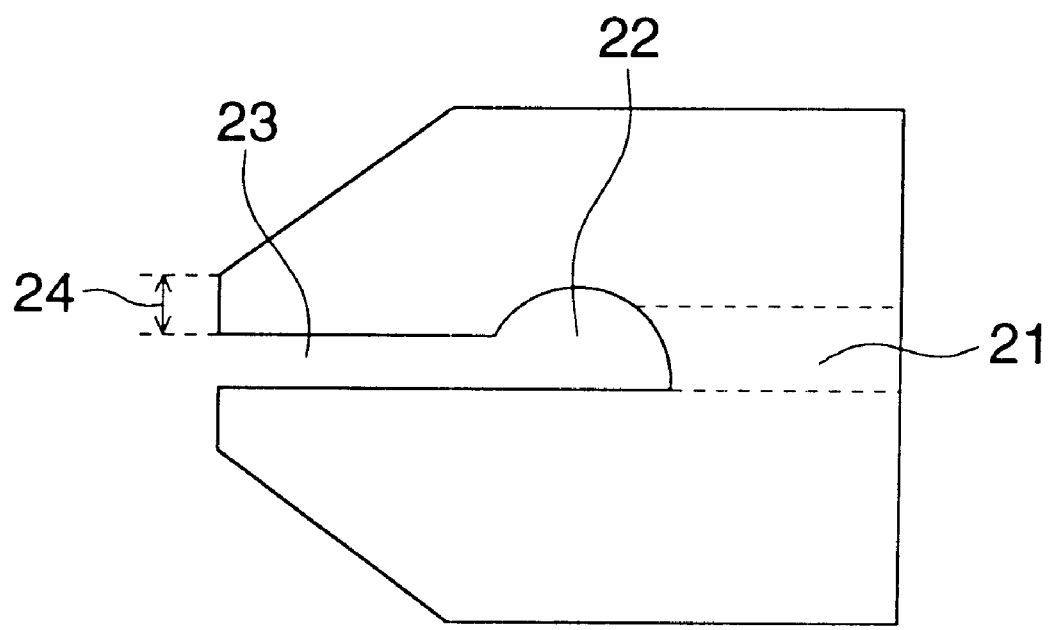
FIG. 4 is a cross-sectional view showing another example of the embodiment of the coating head in a coating apparatus of this invention.

FIG. 4 is a schematic drawing showing another example of the embodiment of the coating head of this invention. In the drawing, 21, 22, and 23 are the same as the above-described ones. The shape of the cross-section of the manifold 22 is semicircular. Further, the shape of the cross-section of the manifold 22 of the coating head shown in FIG. 2 is circular; thus, in the case where the shape of the cross-section of the manifold is circular or semicircular as stated in the above, it becomes possible to make the pressure of the coating solution distributed uniformly over the whole width of the coating head, which has a good effect to the uniformity of thickness of the coated film in the coating width direction. Further, it is also possible to prevent the deformation owing to the pressure acting locally inside the manifold. Moreover, because the flowing-in and flowing-out of the fluid is done smoothly, the ease of cleaning inside the manifold after the completion of coating is also improved so much that in some cases cleaning can be done only by letting a cleaning liquid flow through.

Figure 6:
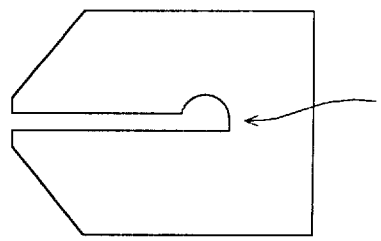
FIG. 6(a) to FIG. 6(d) are cross-sectional views showing modified examples of the manifold.
Figure 6:
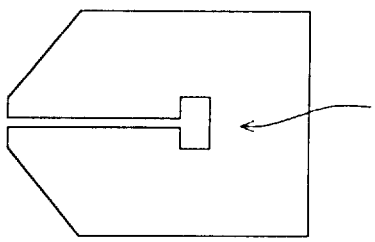
Figure 6:
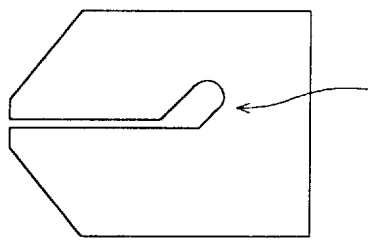
Figure 6:
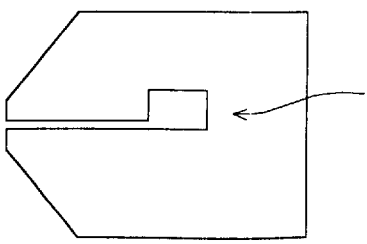

Besides, it is needless to say that, for the shape of the cross-section of the manifold 22, such shapes as shown in FIG. 6(*a*) to FIG. 6(*d*) can be applied.

By making the cross-sectional area of the whole coating head (including the cross-sectional area of the manifold S) equal to or larger than ten times the cross-sectional area of the manifold S of the coating head, the deformation of the whole coating head or the slit portion owing to the pressure of the coating solution in the manifold can be prevented, and the distribution of the amount of the extruded coating solution in the coating width direction and the uniformity of thickness of the coated film in its turn can be improved.

Further, this invention can be applied to all kinds of coating solutions, and especially, it is desirable to apply it to magnetic recording media, photographic photosensitive materials, thermally developable photosensitive materials, and subbing layer for making a film.

Figure 5:
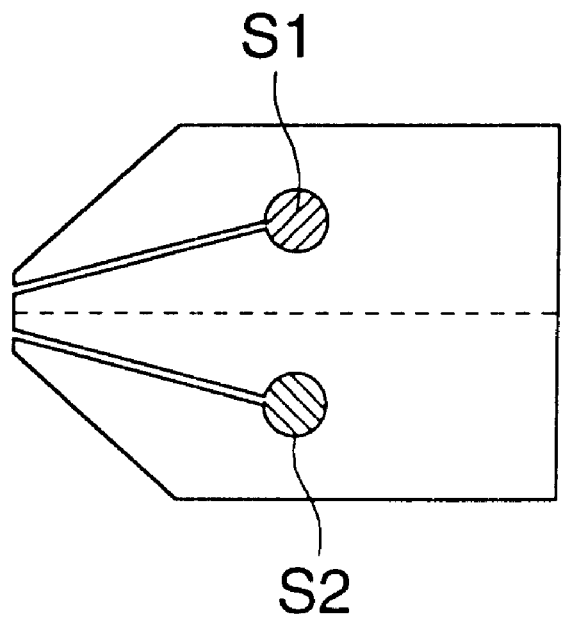
FIG. 5 is a cross-sectional view of a double layer coating head.

Moreover, in the above-described embodiments, examples in which the coating-head comprises one slit and manifold, and one kind of coating solution is extruded at a time from the coating head have been explained; however, this invention is not limited to these examples, but can be applied, as shown in FIG. 5, to an apparatus in which the coating head comprises two or more slits and manifolds and two or more kinds of coating solutions are extruded at a time. In this case, the above-described cross-sectional area of the manifold S should be substituted by the cross-sectional areas S1 and S2 of the respective manifolds, and if the cross-sectional area of the upper part of the coating head which is divided into the upper and lower parts by the broken line (including S1) is made equal to or larger than ten times the cross-sectional area S1, and also the cross-sectional area of the lower part of the coating head (including S2) is made equal to or larger than ten times the cross-sectional area S2, then the deformation of the whole coating head or the slit portion owing to the pressure of the coating solution in the manifold can be prevented, and the distribution of the amount of the extruded coating solution in the coating width direction and the uniformity of thickness of the coated film in its turn can be improved.

EXAMPLE

Hereinafter, an example of the present invention is exemplified. However, the present invention is not limited to this example.

Example of Practice 1

In all of the examples of practice and the examples for comparison, coating and drying were carried out under the same conditions with respect to the common conditions described below and under the respective conditions which are noted in Table 1 with respect to the respectively different conditions, to obtain the coated samples. For each of the coated samples, evaluation was done in terms of the evaluation items described below. The results were shown also in Table 1.

(Common Conditions)

Coating solution: viscosity 0.5 Pa·sec,

Supporting member: width of 1300 mm, thickness of 175 μm, polyethylene-terephthalate, Backup roll: diameter of 300 mm, Method of coating: extrusion (coating by pressing out), Length of edge of coating head (refer to 24 in FIG. 4): 1 mm, Distance between edge of coating head and surface of supporting member held by backup roll: 80 μm, Coating width L: 1085 mm, Thickness of coated film: 50 μm (target value in wet state immediately after coating), Coating speed: 20 m/min, Amount of supply of coating solution: 1085 cc/min (Evaluation Items)

1. Distribution of Thickness of Coated Film in Coating Width Direction

The thickness of the coated film is measured at 20 points which divide the coating width into 21 portions with an equal interval, and the average value of them is calculated. For evaluating the distribution in the coating width direction, first "the maximum thickness of the coated film" is subtracted by "the minimum thickness of the coated film" to obtain the remainder, then the remainder is divided by the "average value" to obtain the quotient. The sample is evaluated by five grade method using the quotient, which is expressed as a percentage, in a manner such that the sample is evaluated as E for the quotient exceeding 20%, D for the one exceeding 10% up to 20%, C for the one exceeding 5% up to 10%, B for the one exceeding 1% up to 5%, and A for the one up to 1%.

Besides, the cross-sectional area of the whole coating head NO. 3 is 8825.365 mm$^2$, and the cross-sectional area of the whole coating head No. 13 is 5914.924 mm$^2$.

2. Defects of Coated Film (Number of Streaks Per 1 m$^2$)

The number of streaks per 1 m$^2$ is visually counted for a predetermined number of portions and the average value is obtained.

TABLE 1

| Sample No. | Type of coating liquid supplying opening (Fig. No.) | Slit length M (mm) | Slit spacing G (mm) | Cross-sectional area of manifold S (mm$^2$) | Circumferential length of cross-section of manifold R (mm) | Shape of manifold |
|---|---|---|---|---|---|---|
| 1 | One at center (FIG. 2(b)) | 20 | 0.35 | 157.080 | 51.416 | Semicircle with diameter of 10 mm |
| 2 | Two at both ends (FIG. 3(a)) | 20 | 0.35 | 157.080 | 51.416 | Semicircle with diameter of 10 mm |
| 3 | One at center (FIG. 2(b)) | 10 | 0.15 | 628.319 | 102.832 | Semicircle with diameter of 20 mm |
| 4 | Two at both ends (FIG. 3(a)) | 10 | 0.15 | 628.319 | 102.832 | Semicircle with diameter of 20 mm |
| 5 | One at center (FIG. 2(b)) | 40 | 0.25 | 353.429 | 77.124 | Semicircle with diameter of 15 mm |
| 6 | Two at both ends (FIG. 3(a)) | 40 | 0.25 | 353.429 | 77.124 | Semicircle with diameter of 15 mm |
| 7 | One at an end (FIG. 3(b)) | 20 | 0.35 | 157.080 | 51.416 | Semicircle with diameter of 10 mm |

TABLE 1-continued

| | | | | | |
|---|---|---|---|---|---|
| 8 | One at an end (FIG. 3(b)) | 10 | 0.15 | 628.319 | 102.832 | Semicircle with diameter of 20 mm |
| 9 | One at an end (FIG. 3(b)) | 40 | 0.25 | 353.429 | 77.124 | Semicircle with diameter of 15 mm |
| 10 | One at center (FIG. 2(b)) | 50 | 0.10 | 628.319 | 102.832 | Semicircle with diameter of 20 mm |
| 11 | Two at both ends (FIG. 3(a)) | 50 | 0.10 | 628.319 | 102.832 | Semicircle with diameter of 20 mm |
| 12 | One at an end (FIG. 3(b)) | 20 | 0.05 | 353.429 | 77.124 | Semicircle with diameter of 15 mm |
| 13 | One at center (FIG. 2(b)) | 10 | 0.15 | 628.319 | 102.832 | Semicircle with diameter of 20 mm |

| Sample No. | Value of central term in inequality (1) | Value of central term in inequality (2) | Whether room for reducing pressure is provided or not, and Value of reduced pressure | Distribution of thickness of coated film in coating width direction | Number of coating streaks per 1 mm² | Remark |
|---|---|---|---|---|---|---|
| 1 | $7.172 \times 10^{-2}$ | — | No | D | 2 | Comp. |
| 2 | $7.172 \times 10^{-2}$ | — | No | D | 2 | Comp. |
| 3 | $7.057 \times 10^{-4}$ | — | No | B | 4 | Inv. |
| 4 | $7.057 \times 10^{-4}$ | — | No | B | 4 | Inv. |
| 5 | $2.582 \times 10^{-3}$ | — | No | B | 1 | Inv. |
| 6 | $2.582 \times 10^{-3}$ | — | No | B | 1 | Inv. |
| 7 | — | $2.869 \times 10^{-1}$ | No | E | 1 | Comp. |
| 8 | — | $2.823 \times 10^{-3}$ | No | B | 3 | Inv. |
| 9 | — | $1.033 \times 10^{-2}$ | No | B | 2 | Inv. |
| 10 | $4.182 \times 10^{-5}$ | — | No | A | 26 | Comp. |
| 11 | $4.182 \times 10^{-5}$ | — | No | A | 26 | Comp. |
| 12 | — | $4.131 \times 10^{-5}$ | No | A | 39 | Comp. |
| 13 | $7.057 \times 10^{-4}$ | — | No | C | 2 | Inv. |

Comp.: Comparison, Inv.: This invention,
*In addition, the cross-sectional area of the whole coating head NO. 3 is 8825.365 mm², and the cross-sectional area of the whole coating head No. 13 is 5914.924 mm².

As is clearly understood from Table 1, it is proved that, in the coating carried out using coating apparatus of this invention, excellent effect is obtained with respect to the distribution of the thickness of the coated film in the coating width direction and defects of coating.

Example of Practice 2

With a reduced pressure chamber provided at the upstream side of the coating head in the coating apparatus used for the samples 5, 6, and 9 in the example of practice 1, similar coatings were carried out. In this case, calculation of the value of the right-hand side of the inequality (3) in the coating apparatus gives 25600 Pa; however, the value of the reduction of pressure in the reduced pressure chamber was let to be 20000 Pa. Then, the evaluation for the distribution of the thickness of the coated film in the coating width direction was varied from B to A, and a better coating performance could be obtained.

Further, with the similar manner, in the coating apparatus used for the sample 5, there is provided a reduced pressure chamber provided at the upstream side of the coating head, the test result in the case the reduced pressure value of the reduced pressure chamber is 20000 Pa is indicated in Sample No. 14 in Table 2 and the test result in the case the reduced pressure value of the reduced pressure chamber is 30000 Pa is indicated in Sample No. 15 in Table 2. As can be seen from these test results, by providing the reduced pressure chamber, the distribution of a coating layer thickness along the coating width is dramatically improved. Further, by making the reduced pressure value ΔP of the reduced chamber lower than the value of the right side of formula (3), the distribution of a coating layer thickness along the coating width is dramatically improved in addition to that coating defects such as streaks are further reduced.

TABLE 2

| Sample No. | Type of coating liquid supplying opening (Fig. No.) | Slit length M (mm) | Slit spacing G (mm) | Cross-sectional area of manifold S (mm²) | Circumferential length of cross-section of manifold R (mm) | Shape of manifold |
|---|---|---|---|---|---|---|
| 14 | One at center (FIG. 2(b)) | 40 | 0.25 | 353.429 | 77.124 | Semicircle with diameter of 15 mm |
| 15 | One at center (FIG. 2(b)) | 40 | 0.25 | 353.429 | 77.124 | Semicircle with diameter of 15 mm |

TABLE 2-continued

| Sample No. | Value of central term in inequality (1) | Value of central term in inequality (2) | Whether room for reducing pressure is provided or not, and (Value of reduced pressure) | Distribution of thickness of coated film in coating width direction | Number of coating streaks per 1 mm² | Remark |
| --- | --- | --- | --- | --- | --- | --- |
| 14 | $2.582 \times 10^{-3}$ | — | Yes (20000 Pa) | A | 1 | Inv. |
| 15 | $2.582 \times 10^{-3}$ | — | Yes (30000 Pa) | A | 17 | Inv. |

For a coating apparatus and the method of coating for coating a supporting member which is being transported in the process of being held and reversed by a backup roll with a coating solution extruded from a coating head, it has become possible to provide a high-precision coating apparatus and coating method wherein the uniformity of thickness of the coated film is achieved and defects owing to coating streaks are reduced.

What is claimed is:

1. A coating apparatus, comprising:
   a coating head having
   a feeding port through which a coating solution is supplied;
   a manifold in which the coating solution supplied through the feeding port is stored; and
   a slit communicating with the manifold;
   wherein the coating head discharges the coating solution in a discharging direction through the slit to a support and is designed such that the slit has a length M (mm) along the discharging direction and a gap G (mm), and the manifold has a coating width L (mm) orthogonal to the discharging direction, a cross sectional area S (mm²) and a circumferential length R (mm) of a cross section, and
   supplying means for supplying the coating solution to the feeding port of the coating head; and
   wherein the coating head and the supplying means are arranged such that the coating solution is supplied symmetrically in terms of the center of the coating width of the manifold through the feeding port into the manifold, and dimensions of the coating head are determined to satisfy formula (1):

$$10^{-4} < (L^2 R^2 G^3)/(24 M S^3) < 10^{-2} \tag{1}.$$

2. The coating apparatus of claim 1, wherein the feeding port and the supplying means are provided such that the coating solution is supplied symmetrically in terms of the center of the coating width of the manifold through the feeding port into the manifold.

3. The coating apparatus of claim 1, wherein the support is a web-shaped support and is coated with the coating solution by the coating head while being conveyed continuously, and the coating apparatus further comprises a backup roll to hold the support.

4. The coating apparatus of claim 3, wherein the backup roll is provided to be opposite to the coating head.

5. The coating apparatus of claim 1, wherein the feeding port is provided by a single piece at the center of the coating width of the manifold.

6. The coating apparatus of claim 1, wherein the coating apparatus comprises two feeding ports as the feeding port, the feeding ports are provided respectively at both ends of the coating width of the manifold and a half of a total amount of the coating solution is supplied through each of the two feeding ports.

7. The coating apparatus of claim 1, wherein the cross section of the manifold is shaped in a circle or a semicircle.

8. The coating apparatus of claim 1, wherein the coating head has a cross sectional area being ten times larger than that of the manifold.

9. The coating apparatus of claim 1, wherein the support is a web-shaped support and is coated with the coating solution by the coating head while being conveyed continuously, and the coating apparatus further comprises a reduced pressure chamber provided at an upstream side of the coating head in terms of a conveyed direction of the support.

10. The coating apparatus of claim 9, wherein formula (3) is satisfied, $$\Delta P < (6 \mu M Q)/(5 L G^3) \tag{3}$$

where
   $\Delta P$ is a degree of the reduced pressure (Pa) in the reduced pressure chamber,
   $\mu$ is a viscosity (Pa·sec) of the coating solution,
   Q is an amount (cc/min) of the coating solution supplied by the supplying means,
   M is a length (mm) of the slit,
   G is a gap of the slit (mm), and
   L is a coating width (mm) of the manifold.

11. A coating apparatus, comprising:
   a coating head having
   a feeding port through which a coating solution is supplied;
   a manifold in which the coating solution supplied through the feeding port is stored; and
   a slit communicating with the manifold;
   wherein the coating head discharges the coating solution in a discharging direction through the slit to a support and is designed such that the slit has a length M (mm) along the discharging direction and a gap G (mm), and the manifold has a coating width L (mm) orthogonal to the discharging direction, a cross sectional area S (mm²) and a circumferential length R (mm) of a cross section, and
   supplying means for supplying the coating solution to the feeding port of the coating head; and
   wherein the coating head and the supplying means are arranged such that the coating solution is supplied asymmetrically in terms of the center of the coating width of the manifold through the feeding port into the manifold, and dimensions of the coating head are determined to satisfy formula (2):

$$5 \times 10^{-4} < (L^2 R^2 G^3)/(6 M S^3) < 5 \times 10^{-2} \tag{2}.$$

12. The coating apparatus of claim 11, wherein the feeding port and the supplying means are provided such that the coating solution is supplied asymmetrically in terms of the center of the coating width of the manifold through the feeding port into the manifold.

13. The coating apparatus of claim 11, wherein the support is a web-shaped support and is coated with the coating solution by the coating head while being conveyed continuously, and the coating apparatus further comprises a backup roll to hold the support.

14. The coating apparatus of claim 11, wherein the backup roll is provided to be opposite to the coating head.

15. The coating apparatus of claim 11, wherein the feeding port is provided by a single piece at one end of the coating width of the manifold.

16. The coating apparatus of claim 11, wherein the cross section of the manifold is shaped in a circle or a semicircle.

17. The coating apparatus of claim 11, wherein the coating head has a cross sectional area being ten times larger than that of the manifold.

18. The coating apparatus of claim 11, wherein the support is a web-shaped support and is coated with the coating solution by the coating head while being conveyed continuously, and the coating apparatus further comprises a reduced pressure chamber provided at an upstream side of the coating head in terms of a conveyed direction of the support.

19. The coating apparatus of claim 18, wherein formula (3) is satisfied, $$\Delta P < (6\mu M Q)/(5 L G^3) \tag{3}$$

where $\Delta P$ is a degree of the reduced pressure (Pa) in the reduced pressure chamber, $\mu$ is a viscosity (Pa·sec) of the coating solution, Q is an amount (cc/min) of the coating solution supplied by the supplying means, M is a length (mm) of the slit, G is a gap of the slit (mm), and L is a coating width (mm) of the manifold.

* * * * *